United States Patent Office 3,072,659
Patented Jan. 8, 1963

3,072,659
ALUMINUM SALTS OF NICOTINIC ACID
AND PROCESS THEREFOR
Bernard F. Duesel, Yonkers, and Godfrey Wilbert, Carmel, N.Y., assignors to Nepera Chemical Co. Inc., Harriman, N.Y., a corporation of New York
No Drawing. Filed Apr. 7, 1959, Ser. No. 804,608
6 Claims. (Cl. 260—270)

This invention relates to a new and novel method of preparing aluminum salts of nicotinic acid in pure form and more particularly to a method for the preparation of aluminum trinicotinate free of other aluminum salts of nicotinic acid.

Nicotinic acid, also known as niacin, is a well-known chemical compound which has proved to be of great value in therapeutics and is recognized as the anti-pellagra factor. Therapeutic compounds are frequently administered in the form of their salts. The aluminum salts of nicotinic acid and particularly aluminum tri-nicotinate represent useful chemical compounds which can release nicotinic acid in the body. Due to the low equivalent weight of aluminum, the inactive aluminum content of such salts is minor. For example, 100 grams of aluminum tri-nicotinate upon hydrolysis can release 93.9 grams of nicotinic acid.

The ease with which aluminum salts of nicotinic acid hydrolyze is therapeutically advantageous but the manufacture of such salts in pure form is difficult. The conventional methods suggested in the literature for preparing metal salts of carboxylic acids have proved to be ineffective in producing aluminum salts of nicotinic acid in desirably pure form. Since aluminum has a valence of three, it is apparent that three aluminum salts of nicotinic acid are possible, that is aluminum mono-, di-, or tri-nicotinate. Since aluminum tri-nicotinate has the lowest percentage of aluminum and the highest percentage of active nicotinate radical, this particular compound is the most desirable from a pharmaceutical standpoint.

One conventional procedure for the preparation of metal salts of carboxylic acids is by double decomposition. In this method, employing suitable reactants, a soluble salt of the carboxylic acid is mixed with a soluble salt of the metal whose carboxylic acid salt is desired and the metal salt of the carboxylic acid then separates as a precipitate. When this method was attempted with nicotinic acid by adding sodium nicotinate to a solution of aluminum sulfate in the proportions of three mols of sodium nicotinate to one mol of aluminum sulfate, a precipitate was obtained. This precipitate upon analysis proved to be a mixture of aluminum mono-, di-, and tri-nicotinates and not exclusively the desired aluminum tri-nicotinate. In another procedure the calcium salt of nicotinic acid was treated with aluminum sulfate in the proper proportions, the precipitated calcium sulfate was removed, and the filtrate then treated to obtain the aluminum nicotinate salt. The product obtained was again found to be a mixture of aluminum nicotinate salts and not pure aluminum tri-nicotinate.

Another procedure recommended in the literature for the preparation of aluminum salts of carboxylic acids, such as benzoic acid, is to reflux a solution of the acid in alcohol with aluminum turnings in the presence of a small amount of mercury chloride as a catalyst. This procedure proved to be inoperative with nicotinic acid, since the catalyst appeared to open the nicotinic acid ring.

Another procedure suggested for the preparation of aluminum salts of carboxylic acids is to reflux the acid in a solvent such as xylene with an aluminum alcoholate, such as aluminium methylate for example. When this procedure was attempted with nicotinic acid no appreciable yield of the desired aluminum salt was produced.

It is an object of this invention to provide a method of obtaining aluminum salts of nicotinic acid in good yields.

It is a further object of this invention to provide a method for obtaining aluminum tri-nicotinate free of other aluminum salts of nicotinic acid.

Other objects and the advantages of this invention will become apparent from the following detailed description.

It has now been found that pure aluminum salts of nicotinic acid can be prepared by mixing a hot aqueous suspension of nicotinic acid with a hot aqueous suspension of a reactive form of aluminum hydroxide and recovering the aluminum salt thus formed from the mixture by crystallization. The ratio of nicotinic acid to aluminum hydroxide employed depends upon whether the mono-, di- or tri-nicotinate salt is desired. It has been found that the product which is recovered upon crystallization of the reaction mixture formed is the desired aluminum salt in pure form and free of the other salt forms. For example, when three mols of nicotinic acid are reacted with one mole of aluminum hydroxide in accordance with the process of this invention, aluminum tri-nicotinate is obtained free of aluminum mono- and di-nicotinate.

It is important that the aluminum hydroxide used in the process of this invention be a reactive form of aluminum hydroxide, that is one capable of reacting in aqueous suspension with acids. Aluminum hydroxide exists in various physical forms depending on the method of preparation, the method of purification, the age of the material and the like. Not all of the forms of aluminum hydroxide are suitable for use in the method of this invention. The suitability of an aluminum hydroxide for use in the process of this invention may be determined by mixing 500 mg. of the aluminum hydroxide with 10 ml. aqueous hydrochloric acid containing 10 percent by weight of hydrogen chloride and warming the mixture slightly. If the aluminum hydroxide is soluble under these conditions, it is suitable for use in this invention. The term "reactive" as applied to aluminum hydroxide in the specification and claims refers to an aluminum hydroxide which is soluble under the conditions of the above described test.

Freshly precipitated aluminum hydroxide, formed for example by adding ammonia to an aqueous solution of aluminum sulfate, is a reactive form of aluminum hydroxide which may be used successfully in this invention. Another suitable form of aluminum hydroxide is U.S.P. aluminum hydroxide gel, as described in vol. 14, page 29, of the U.S. Pharmacopoeia. On the other hand, crystalline aluminum hydroxide is not a reactive form of aluminum hydroxide and accordingly is not suitable for use in this invention.

The reaction of nicotinic acid with a reactive form of aluminum hydroxide is carried out in a hot aqueous suspension of the reactants. The temperature of the reaction mixture is normally maintained between about 60° C. and about 95° C. at reaction temperatures below 60° C., the reaction does not go to completion; at temperatures above 95° C., the yield of the desired aluminum nicotinate salt is reduced due to hydrolysis. A reaction temperature of between 80° C. and 90° C. is preferred.

The molar proportions of the reactants chosen are governed by the particular aluminum nicotinate salt to be produced. In the preparation of the preferred aluminum tri-nicotinate, 3 mols of nicotinic acid are reacted with 1 mol of aluminum hydroxide.

The heated aqueous suspension of the reactants is stirred for about 10 to about 30 minutes and then the aluminum nicotinate salt formed is recovered from the mixture by filtration. For maximum yield, the mixture may be cooled to between 0 and 5° C. prior to filtration.

The following examples are included further to illustrate the method of this invention:

Example I

A slurry of 123 grams of nicotinic acid in 500 ml. distilled water was mixed with a slurry of 78 grams U.S.P. aluminum hydroxide gel in 300 ml. of distilled water at a temperature of 85° C. The molar proportion of the reactants in the mixture is 1 mol of nicotinic acid to 1 mol of aluminum hydroxide. The mixture was stirred at the reaction temperature for 15 minutes. Initially, the solid reactants in the slurry went into solution but then a white semi-crystalline precipitate formed which was recovered by filtration and washed with 25 ml. water. The product, aluminum mono-nicotinate, after drying at 100° C. to constant weight, was found by chemical analysis to contain 14.8 percent by weight of aluminum which is the theoretical calculated aluminum content in aluminum mono-nicotinate.

Example II

A slurry of 98.5 grams of nicotinic acid in 234 ml. distilled water was mixed with a slurry of 20.8 grams of U.S.P. aluminum hydroxide gel in 100 ml. distilled water at a temperature of 85° C. The molar proportions of the reactants in the mixture obtained is 3 mols of nicotinic acid to 1 mol of aluminum hydroxide. The mixture was stirred at the reaction temperature for 15 minutes. Initially, the solid reactants in the slurry went into solution but a small white crystalline precipitate formed by the end of the 15 minutes reaction time. The mixture was then cooled to 0–5° C. under external cooling over a period of several hours to induce further crystallization. White crystals of aluminum tri-nicotinate were separated from the mixture by filtration and dried at 100° C. to constant weight. The aluminum content on chemical analysis was found to be 6.7 percent or the theoretical aluminum content for aluminum tri-nicotinate.

It is understood that the foregoing detailed description is given merely by way of illustration and that many variations may be made therein without departing from the spirit of our invention.

Having described our invention, what we desire to secure by Letters Patent is:

1. A method of preparing an aluminum salt of nicotinic acid in pure form which comprises mixing an aqueous suspension of nicotinic acid with a reactive form of aluminum hydroxide at a temperature between about 60° C. and about 95° C.

2. A method according to claim 1 wherein the reactants are maintained at the reaction temperature for between about 10 and about 30 minutes.

3. A method of preparing aluminum trinicotinate in pure form which comprises mixing an aqueous suspension of nicotinic acid with a reactive form of aluminum hydroxide at a temperature between about 60° C. and about 95° C. in the molar proportions of 3 mols of nicotinic acid to 1 mol of aluminum hydroxide.

4. A method according to claim 3 wherein the reactants are maintained at the reaction temperature for between about 10 and about 30 minutes.

5. A method according to claim 4 wherein the reaction temperature is between 80° C. and 90° C.

6. A method according to claim 4 wherein the mixture of reactants at the conclusion of the reaction is cooled to a temperature of between about 0° C. and 5° C. and is filtered to recover said aluminum trinicotinate.

References Cited in the file of this patent
UNITED STATES PATENTS

| | | |
|---|---|---|
| 2,230,616 | Dowzard et al. | Feb. 4, 1941 |
| 2,417,071 | Gebhart et al. | Mar. 11, 1947 |
| 2,447,234 | Dean et al. | Aug. 17, 1948 |
| 2,827,462 | Dorsey et al. | Mar. 18, 1958 |
| 2,844,551 | Orthner et al. | July 22, 1959 |
| 2,932,659 | Orthner et al. | Apr. 12, 1960 |
| 2,970,082 | Miale | Jan. 31, 1961 |